United States Patent
Lillelund et al.

(10) Patent No.: US 6,505,548 B1
(45) Date of Patent: Jan. 14, 2003

(54) GARLIC PRESS

(75) Inventors: Stig Lillelund, Gentofte (DK); Jakob Heiberg, Charlottenlund (DK)

(73) Assignee: Dart Industries Inc., Orlando, FL (US)

( * ) Notice: Subject to any disclaimer, the term of this patent is extended or adjusted under 35 U.S.C. 154(b) by 0 days.

(21) Appl. No.: 10/092,314

(22) Filed: Feb. 28, 2002

(51) Int. Cl.[7] .......................... A47J 19/06; A47J 42/34; B30B 7/00; B30B 9/02; B30B 9/06
(52) U.S. Cl. ....................... 99/510; 99/495; 100/112; 100/125; 100/234
(58) Field of Search ..................... 99/495, 506–510, 99/511; 100/112, 125, 234, 99, 116, 243; 241/167, 169.1, 273.3, 169.2, 95; D7/665, 666

(56) References Cited

U.S. PATENT DOCUMENTS

| | | | |
|---|---|---|---|
| 2,776,616 A | | 1/1957 | Sarossy |
| 3,636,999 A | | 1/1972 | Cordes |
| 4,069,752 A | * | 1/1978 | Ahner ..................... 100/112 |
| 4,466,346 A | * | 8/1984 | Gemelli ................... 1001/112 |
| 4,545,299 A | * | 10/1985 | Ahner ..................... 99/495 X |
| 4,582,265 A | * | 4/1986 | Petronelli ................ 99/495 X |
| 5,101,720 A | | 4/1992 | Bianchi |
| 5,163,362 A | * | 11/1992 | Gaber et al. ............. 99/495 X |
| 5,165,335 A | * | 11/1992 | Bianchi .................. 99/495 X |
| 5,303,640 A | * | 4/1994 | Gaber et al. ............. 99/458 X |
| 5,370,044 A | | 12/1994 | Lackie |
| 5,463,941 A | | 11/1995 | Gibson |
| 5,467,699 A | | 11/1995 | Laib |
| D364,999 S | | 12/1995 | Malinosky |
| 5,513,562 A | | 5/1996 | Moor |
| 5,520,104 A | | 5/1996 | Ancona et al. |
| 5,791,237 A | | 8/1998 | Gibson |
| D417,824 S | | 12/1999 | Joergensen |
| D425,762 S | | 5/2000 | Short et al. |
| 6,382,090 B1 | * | 5/2000 | Kokkinos et al. ............. 99/510 |
| 6,109,170 A | | 8/2000 | Short et al. |
| D436,807 S | | 1/2001 | Chin |
| 6,237,474 B1 | | 5/2001 | Short et al. |

FOREIGN PATENT DOCUMENTS

GB        2042019        2/1995

\* cited by examiner

Primary Examiner—Timothy F. Simone
(74) Attorney, Agent, or Firm—John A. Doninger

(57) ABSTRACT

A garlic press including a pivotally joined base and handle with an intermediate press plate pivoted therebetween and cooperating with the base in defining a receiving chamber selectively receiving an enlarged pressure block formed on the handle. The press plate includes a bladed cutter assembly engageable with the upper surface of the base for the severing of a base supported item, the base itself having an elongate hand receiving opening formed therein to define an upper hand grip functioning in conjunction with the handle to manipulate the press, and a lower base support, below the opening, for a direct supporting engagement of the base on a support surface allowing operation of the press by a direct downward pressure on the handle against a surface supported base.

20 Claims, 5 Drawing Sheets

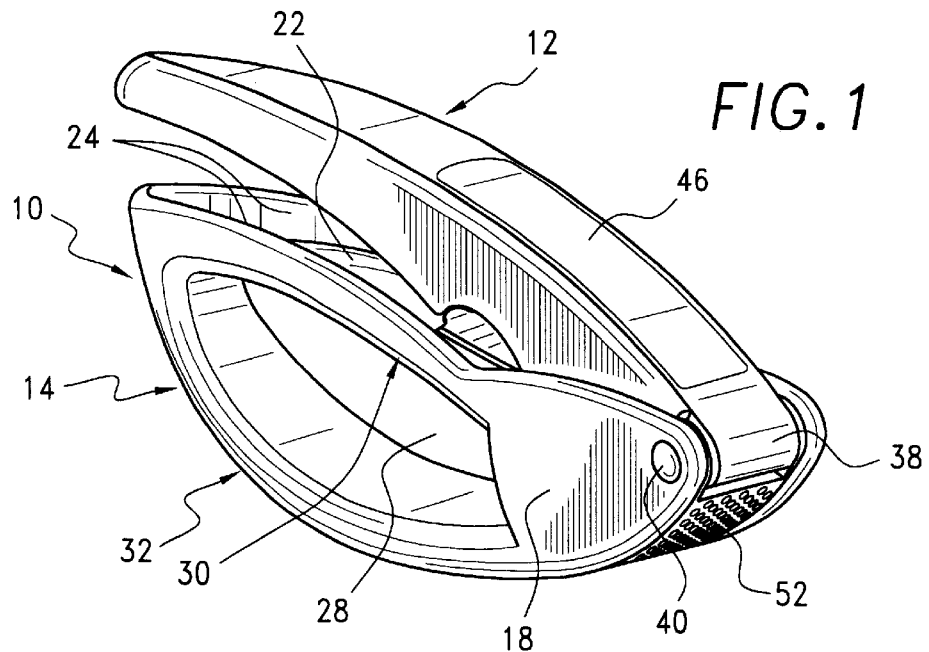
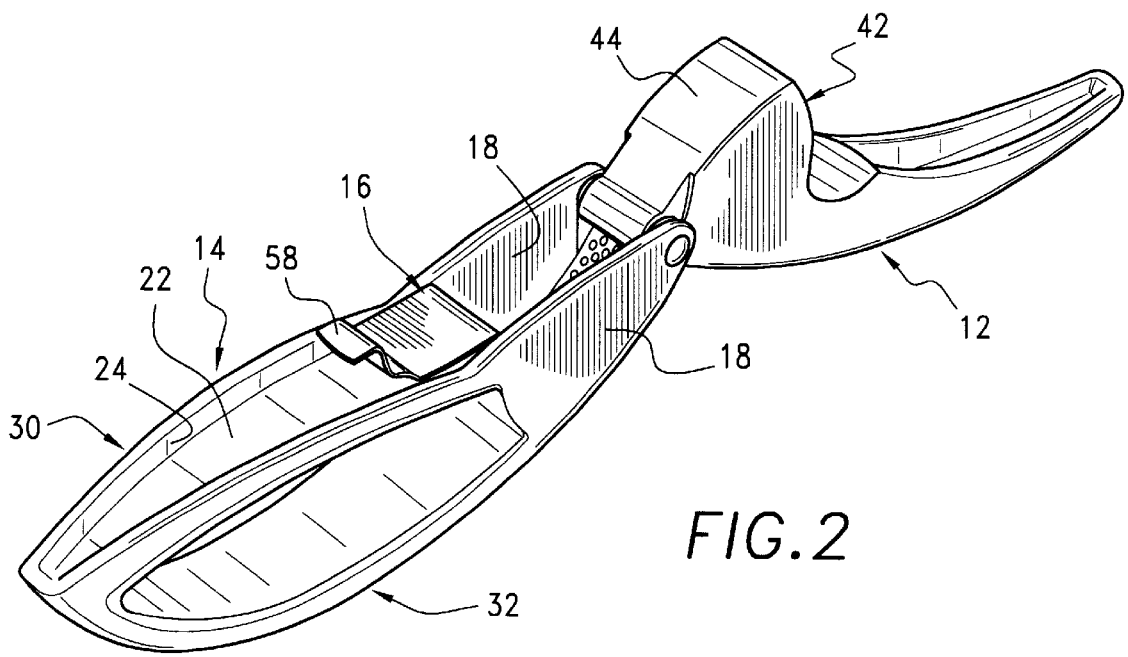

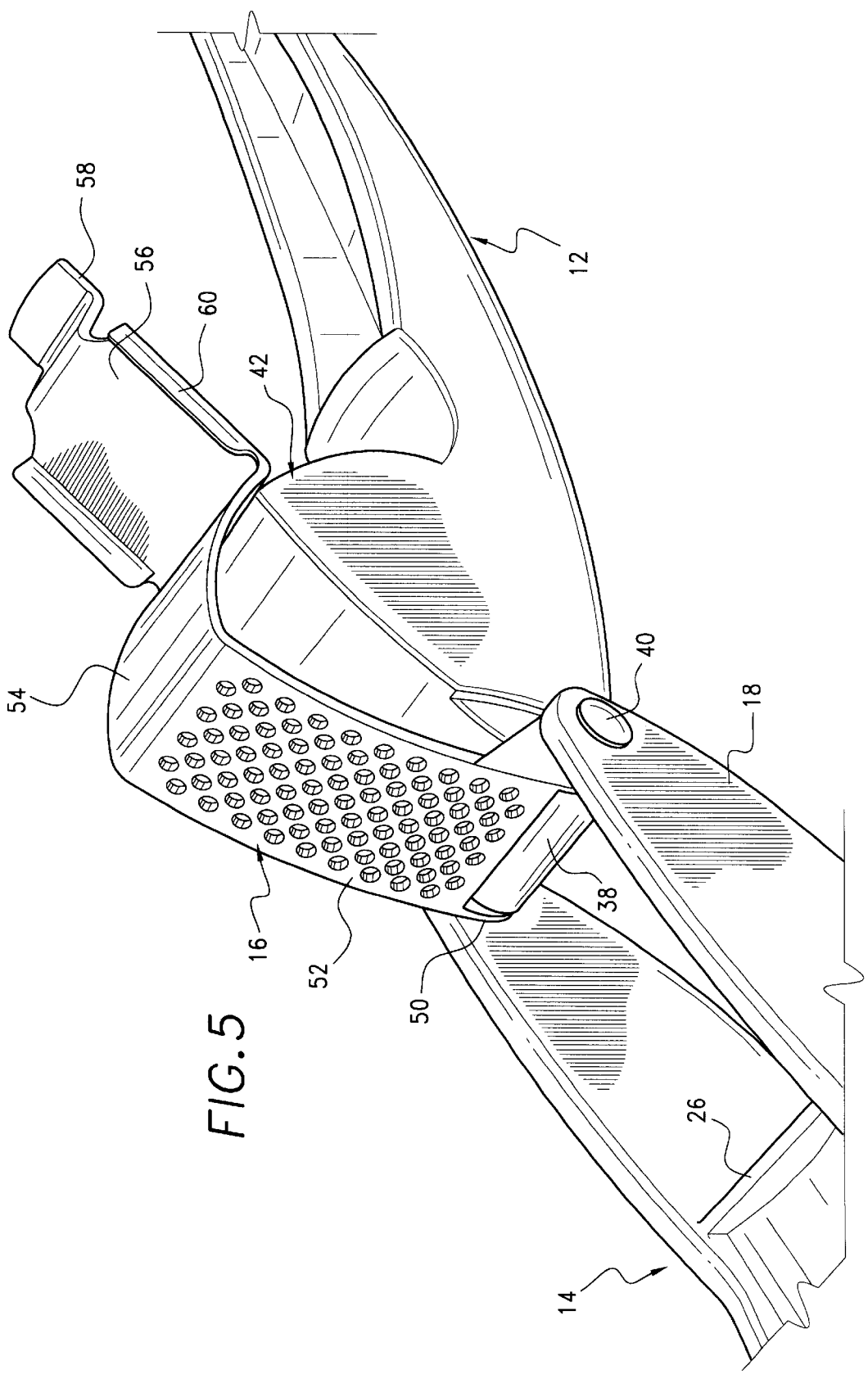

GARLIC PRESS

BACKGROUND OF THE INVENTION

The present invention broadly relates to kitchen implements, and is more particularly concerned with a garlic press, an implement to which a substantial body of prior patent art has been directed.

As will be recognized by those familiar with the prior art, the conventional garlic press is hand-held with opposed handles grasped and firmly squeezed together to effect a crushing action on a garlic received within some form of retaining pocket, preferably with a perforated screen.

Depending upon the particular condition of the garlic, it may be necessary to provide for a preliminary preparation of the garlic. For example, and particularly with dry brittle-shelled cloves, it may be necessary to initially cut off the root end prior to the application of the pressure.

Similarly, and again depending upon the nature of the garlic or garlic bulbs, it is occasionally quite difficult, particularly for the elderly or infirm, to apply a sufficient squeezing action on the two handles of a conventional garlic press to achieve the desired pressing or crushing action. Such a problem could arise in any circumstances wherein the hand of the manipulator of the implement is too weak to achieve the desired pressure.

SUMMARY OF THE INVENTION

The garlic press presented herein constitutes a significant advance in this crowded field of invention. More specifically, the garlic press of the invention proposes, as one of its principle objects, the incorporation of a cutter as an integral part thereof to allow for such cutting actions as may be necessary by the presser implement itself manipulated substantially as it would be manipulated in the pressing action.

Another significant feature of the press of the invention is the adaptability for use both in the manner of a conventional press with opposed handle portions which are mutually grasped and brought together, and, alternatively, as an implement wherein the pressing action is achieved by merely exerting downward pressure on an upper handle against a fixedly positioned or supported base, thus allowing for utilization of the strength of the arm rather than merely relying on a finger gripping action as might be difficult for the weak or infirm.

Another significant feature of the invention is the formation of the lower hand grip or base unit so as to actually allow the user of the press to hang the press from the hand or fingers thereof after the cutting and/or pressing operations and while peeling the cloves. There is no need to lie the presser down or put it away as the subsequent steps are performed. This advantage becomes particularly significant wherein multiple garlic bulbs are to be processed.

More specifically, and in order to achieve the desired objects and advantages of the invention, the garlic press includes a combined strainer and cutter press plate interposed between an upper handle and a lower enlarged base. The handle is pivotally mounted to the base on a common pivot pin with the handle. The press plate defines a pressing chamber which selectively receives a presser block or foot integral with the handle upon a downward swinging of the handle relative to the base.

The press plate, preferably of an appropriate rigid metal, includes an extending portion, opposed from the pinned end thereof, which overlies a shallow elongate recess defined in the upper edge of the base. This extending portion of the press plate including a pair of laterally spaced depending cutter blades which, either independently, or in cooperation with the sides of the upper base recess, are utilized to sever the end or ends of the garlic or cloves thereof. The press plate includes a projecting gripping end or lip which allows for an independent manipulation of the press plate during the cutting action or, as desired for the greater cutting force, an engagement of the press plate with and about the presser block for manipulation thereof by the upper handle itself.

The base is specifically configured with an elongate central hand accommodating opening which forms an upper hand grip about which the fingers of a user will engage as the thumb and base of the thumb wrap about the upper handle, thus allowing for a squeezing action to achieve the desired pressing and/or cutting. The lower portion of the base acts as a stand and allows the user, as desired, to position the base, below the hand, on a tabletop or the like whereby the desired compressive movement of the handle downward toward the hand grip can be effected merely by a direct downward pressure on the handle without requiring a counteracting upward pressure by the hand or fingers against the hand grip. In other words, the hand will merely stabilize the device as downward force is applied to the handle, thus enabling use of the entire strength of the arm, as opposed to merely the hand grip. As noted above, this could be quite significant in those instances wherein hand strength is minimal.

The base opening also provides an additional advantage in that the implement can loosely hang from the hand while the cloves are being separated, thus avoiding the necessity of placing the garlic press down between bulbs when multiple bulbs are being prepared.

Other details, features and advantages of the invention will become apparent as the garlic press of the invention is more fully hereinafter described.

BRIEF DESCRIPTION OF THE DRAWINGS

FIG. 1 is a front and side perspective view of the garlic press of the invention;

FIG. 2 is a perspective view of the garlic press with the handle outwardly pivoted and the presser block withdrawn from the pressing chamber;

FIG. 5 is a perspective detail illustrating the press plate engaged with the presser block for manipulation of the cutter by the handle;

DESCRIPTION OF PREFERRED EMBODIMENTS

Figure 3:
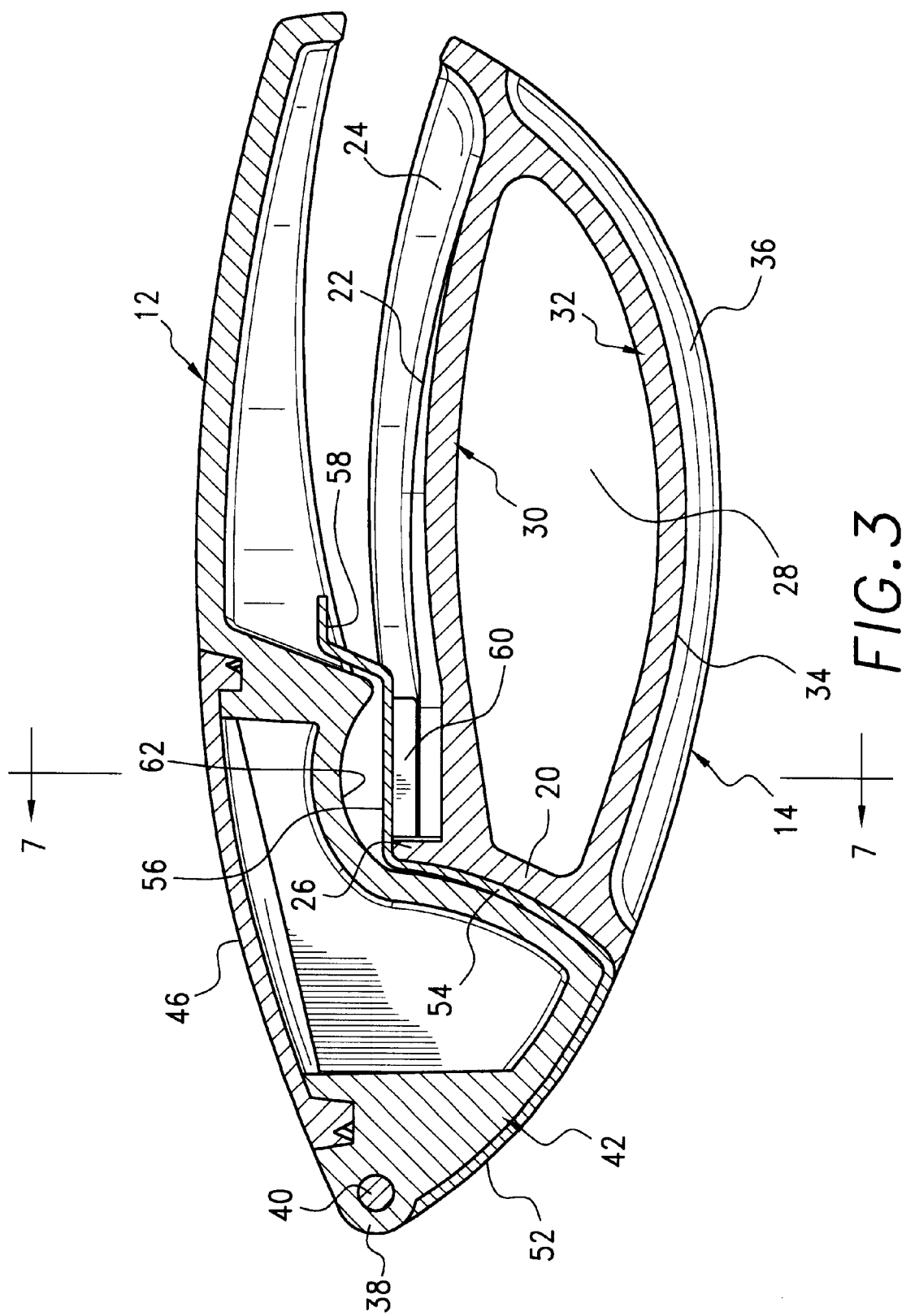
FIG. 3 is a longitudinal cross-sectional view through the closed press.

Referring now more specifically to the drawings, the garlic press 10 basically comprises three components, a handle 12, a base 14 and a press plate 16. The forward portion of the base 14 includes a pair of laterally spaced side walls 18 which extend forward from. a transverse upwardly arcing inner wall 20.

The upper surface of the base 14 includes an elongate front to rear recess 22 defined therein by opposed upwardly projecting edge flanges 24 which converge rearwardly along slightly arcuate paths from a forward transverse upwardly projecting ridge seat 26 aligned over the transverse inner wall 20.

An elongate central hand accommodating opening 28 is defined through the base 14 at approximately mid-height therein. The opening extends rearwardly from the wall 20 to the closed rear end portion of the base. This opening 28 defines an upper hand grip portion 30 about which the hand partially engages during use of the press as shall be explained subsequently. The upper surface of this hand grip portion includes the afore described recess 22 and opposed edge flanges 24. The lower portion 32 of the base 14 is formed with a full length recess 34 therein defined between depending edge flanges 36. As will be noted from the drawings, this lower surface of the base is distinctly arcuate.

The handle 12 is approximately equal length with the base 14 and includes a forward end portion 38 which is received between the spaced forward ends of the base side walls 18 and pivotally joined thereto by an appropriate transverse pivot pin 40 for a selective swinging movement of the handle 12 relative to the base as will be appreciated in selected views.

The handle, immediately adjacent the pivotal joinder thereof to the base, includes an enlarged presser block or foot 42 having an arcuate lower surface 44 generally conforming to the arc of the lower surface of the base 14 as will be best noted in the cross-sectional view of FIG. 3. The width of the handle, and particularly the presser block 42 portion thereof, is such as to be closely received between the opposed side walls 18 of the base 14 as the handle is moved to its closed operative position as illustrated in FIG. 1.

For ease of grasping and manipulation of the handle 12, the upper surface thereof can be slightly arced as illustrated. Further, if desired, provision can be made for a snap-in name plate 46 as suggested in FIGS. 1 and 3.

Figure 4:
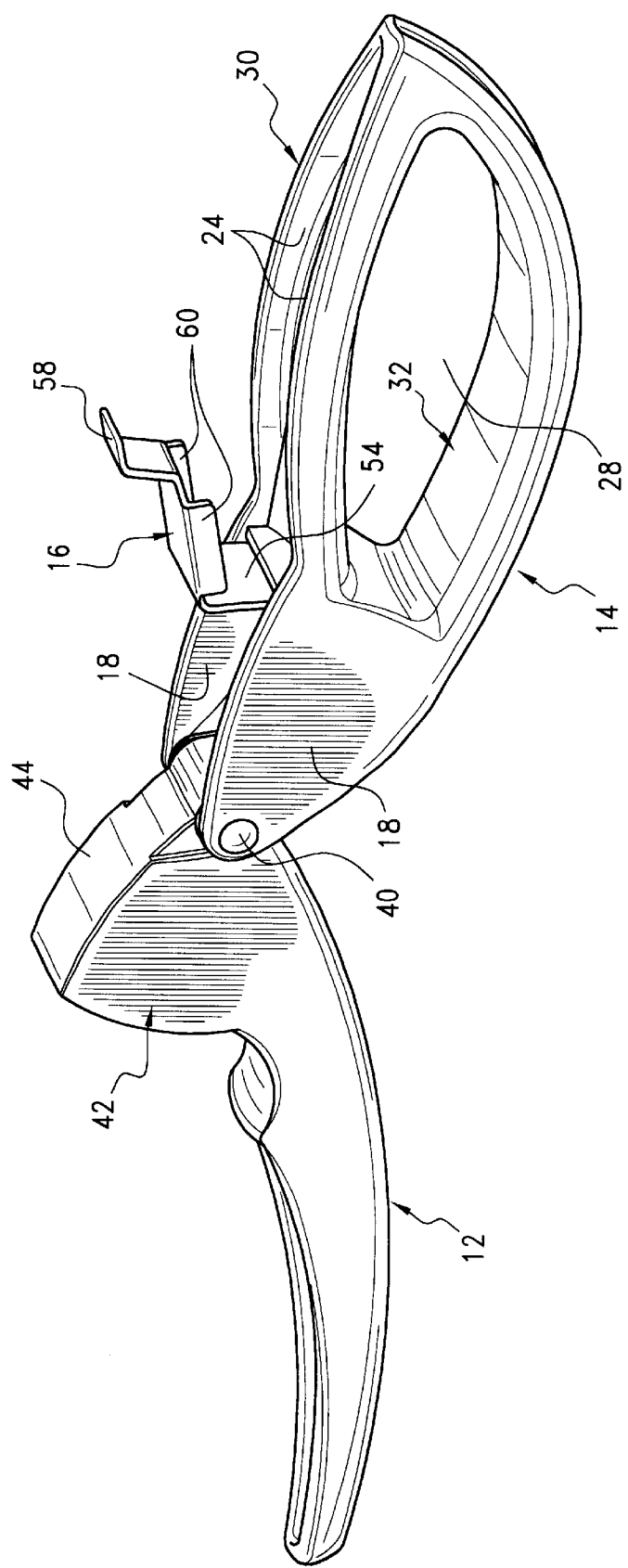
FIG. 4 is a perspective view similar to FIG. 2 with the press plate upwardly pivoted to expose the cutter blades.
Figure 6:
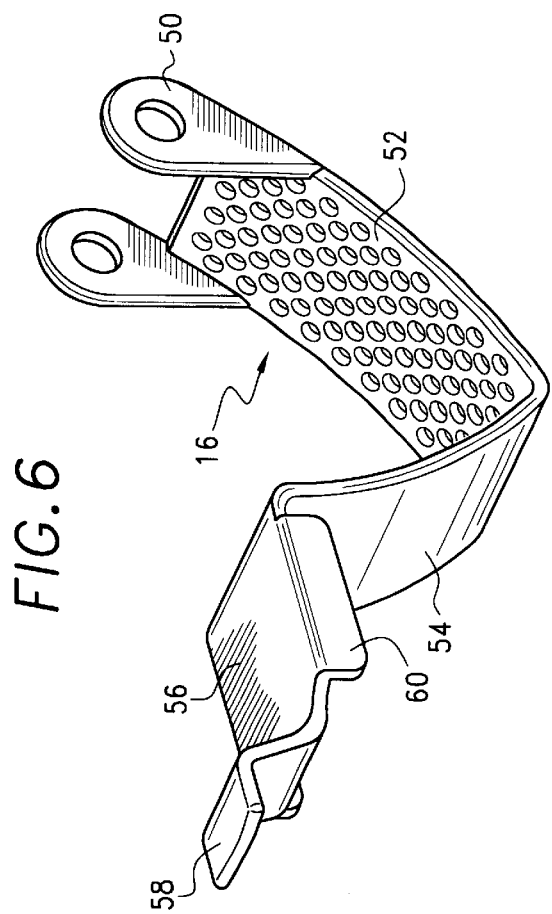
FIG. 6 is a perspective view of the press plate.

The press plate 16, separately illustrated in FIG. 6 and in operative position in FIGS. 3, 4 and 5 in particular, includes, at the forward end thereof, a pair of upwardly projecting apertured ears 50 which mount on the pivot pin 40 joining the handle and base. An elongate arcuate perforated bottom panel 52 extends rearwardly of the ears 50 and terminates in a slightly upwardly arcing rear wall 54. Noting FIGS. 1 and 3 in particular, the perforated bottom panel 52 is slightly arcuate and conforms to the arc of the lower surface of the base 14 and the opposed forward side walls thereof. The plate rear wall 54, with continued reference to FIG. 3, conforms to and lies against the inner face of the upwardly arcing inner wall 20 of the base 14. This plate rear wall 54, in the fully seated position of the plate 16, extends to the upper edge of the ridge seat 26, at which point an integral panel 56 extends rearwardly and terminates in an upwardly and rearwardly offset grip or gripping flange 58.

Figure 7:
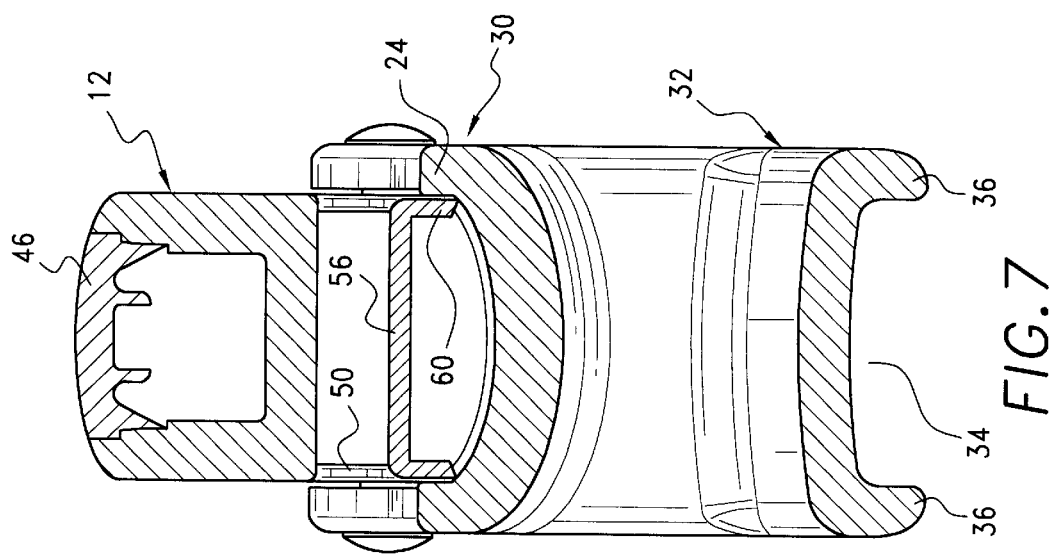
FIG. 7 is a cross-sectional detail taken substantially on a plane passing along line 7—7 in FIG. 3 and illustrating the cutter blades in cross section.

A pair of cutter blades 60 depend from the opposed side edges of the top panel 56 and, in the fully seated position of FIGS. 3 and 7, lie immediately inward of the upper ribs or flanges 24 on the top surface of the base 14, thereby providing for a shearing action therebetween as the press plate pivots downwardly to its seated position. It will be noted in FIG. 3 that the blades 60 are spaced slightly rearward of the rear wall 54 so as to accommodate the ridge seat 26 which limits the downward pivotal movement of the press plate 16. Also, with continued reference to FIG. 3, it will be seen that the undersurface of the handle, immediately rearward of the presser block 42, is upwardly relieved as at 62 so as to not interfere with a full seating of the pressure block 42 within the chamber defined between the base side walls 18 by the bottom panel 52 and rear wall 54 of the press plate.

With reference to FIG. 3, it will be noted that the pressure block or foot 42 closely conforms to the perforated bottom panel 52 and plate rear wall 54 in its fully seated position. Also, the forward portion of the handle 12, including the presser block 42, can be hollow to reduce the overall weight of the device for ease of handling.

As suggested in FIG. 4, the cutter assembly, basically comprising the blades 60, can be manipulated independently of the handle 12 by a pivotal forward withdrawal of the handle and a manual grasping of the hand grip 58 of the press plate 16. Alternately, and for example where greater pressure might be desired for the cutting action, the press plate 16 can be engaged over the pivotally withdrawn presser block 42 and swung into the cutting position utilizing the handle 12 itself as suggested in FIG. 5.

In use, the implement will be grasped in one hand with the fingers curling through the base opening 28 and about the hand grip 30, while the thumb and base of the thumb engage with and about the overlying handle 12. Prior to this hand engagement, particularly if the bulb has dried and the cloves are brittle shelled, the handle and cutter assembly will be pivotally withdrawn, the bulb properly aligned, and the cutter assembly manually manipulated, either by itself through a gripping of the hand grip 58 or through a manipulation thereof by the handle 12, to sever one or both ends of the bulbs to free the cloves. Next, the handle 12 is pivotally withdrawn with the press plate 16 retained in its seated position for reception of the garlic within the defined chamber. The handle is then pivoted to bring the presser block into the chamber to effect the desired pressing with any effluent, being accommodated by the perforated bottom panel 52. Incidentally, in those instances where fresh soft shelled cloves are involved, the aforedescribed cutting step utilizing the cutter assembly may not be necessary in order to effect the desired peeling of the cloves.

The hand gripping pressure required to effect the cutting and pressing will of course vary with the nature of the bulbs involved. In order to accommodate those who do not have sufficient hand strength or manual dexterity to effectively operate the implement by hand gripping of the handle and hand grip and squeezing the handle and base toward each other, specific provision is made to provide an alternate manner of manipulating the implement. More specifically, the closed lower portion 32 of the base allows the base to be seated on an appropriate support surface, such as a tabletop, counter or the like with the necessary closing pressure on the handle requiring only a direct downward pressure on the handle. The depending edge flanges 36 are desirable to accommodate the base to any surface irregularities on the support surface. The press plate cutter assembly can be similarly operated by merely a straight downward pressure. While it would be preferred that the device be stabilized by a wrapping of the fingers through the hand accommodating opening and about the base hand grip portion while downwardly pressing on the handle, even this would not be necessary.

Another desirable feature of the invention is the ability of the user of the device to leave the device hanging from the hand as the cloves are peeled, thus avoiding the necessity of finding a place to put the press down, and also having the press readily available for repeated use when multiple bulbs are to be handled.

As suggested in FIG. 4, the handle 12 can be rotated open to a position which fully exposes the press plate 16 and allows for an upward pivoting of this plate for easy cleaning and such maintenance as may be required.

The foregoing is considered illustrative of the principles of the invention. Other features and advantages as may reside in the details of the invention and be obvious to those skilled in the art, are to be considered within the the scope of the invention as set forth in the following claims.

What is claimed is:

1. A manually manipulated garlic press comprising a base, a handle, said base and handle having common forward ends, pivot means for pivotally joining said ends for pivotal movement of said handle toward and away from said base about a pivot axis, a press plate between said base and said handle, said plate being pivotally mounted at a first end thereof to said base for pivotal movement about said pivot axis, said plate including a bottom panel extending from said first end to an upwardly directed rear wall, said bottom panel and said rear wall forming a receiving chamber in said base, a top panel on said plate extending from said rear wall to an opposite side thereof from said bottom panel and overlying said base rearward of said chamber, a cutter assembly depending from said top panel, and grip means extending from said top panel for pivotal hand manipulation of said press plate with the cutter assembly independently of said base and said handle, said base having an upper surface configured for cooperation with said cutter assembly upon a downward pivotal movement of said cutter assembly toward said base.

2. The garlic press of claim 1 wherein said top panel has opposed side edges, said cutter assembly comprising at least one cutter blade depending from said top panel adjacent one of said side edges.

3. The garlic press of claim 2 wherein said cutter assembly includes two cutter blades, one depending from said top panel adjacent each of said side edges.

4. The garlic press of claim 3 wherein said upper surface of said base includes a pair of laterally spaced, upwardly projecting ribs immediately outward of said blades, said blades, upon a downward pivoting of said cutter assembly, moving inward of and parallel to said ribs to provide a severing action therebetween.

5. The garlic press of claim 4 wherein said handle includes a presser block thereon immediately adjacent said pivot means and conforming to the chamber defined by the bottom panel and rear wall of said press plate, said press plate being selectively engaged with and pivotally moved by said handle and presser block.

6. The garlic press of claim 5 wherein said bottom panel of said press plate is perforated.

7. The garlic press of claim 6 wherein said base has an elongate hand-accommodating opening defined therein at approximately mid-height, said base, above said opening, forming a hand grip aligned with said handle, said base having a bottom portion below said opening forming a base support for the positioning of said press on a surface with the opening and hand grip upwardly spaced from the surface.

8. The garlic press of claim 7 wherein said base support has a lower surface with opposed side edges, and a pair of ribs depending from said lower surface along said side edges.

9. The garlic press of claim 5 wherein said base has laterally spaced side walls rearward of said pivot means, said side walls receiving said press plate bottom panel and rear wall therebetween, said side walls also receiving said pressure block therebetween.

10. The garlic press of claim 1 wherein said base has an elongate hand-accommodating opening defined therein at approximately mid-height, said base, above said opening, forming a hand grip aligned with said handle, said base having a bottom portion below said opening forming a base support for the positioning of said press on a surface with the opening and hand grip upwardly spaced from the surface.

11. The garlic press of claim 10 wherein said base support has a lower surface with opposed side edges, and a pair of ribs depending from said lower surface along said side edges.

12. For use in a garlic press, a press plate comprising an elongate bottom panel having opposed ends, an end wall extending upward from one end of said bottom panel, said end wall terminating in an upper end, a laterally directed top panel extending from said upper end of said end wall to the opposite side thereof from said bottom panel, said top panel having opposed side edges, a pair of cutter blades extending along and depending from said top panel, one cutter blade adjacent each of said side edges, and a hand grip extending from and offset from said top panel for manual manipulation of said press plate.

13. The press plate of claim 12 wherein said bottom panel is perforated.

14. The press plate of claim 13 including a pair of laterally spaced upwardly projecting ears extending from said bottom panel at one of the ends thereof remote from said end wall, said ears having pivot accommodating means defined therein.

15. A manually manipulable garlic press comprising a base, a handle, said base and handle having common forward ends, pivot means for pivotally joining said ends for pivotal movement of said handle toward and away from said base about a pivot axis, a press plate including a bottom panel and defining an upwardly opening receiving chamber in said base, said base having an elongate hand accommodating opening defined therein, said base, above said opening, forming a hand grip aligned with said handle, said base having a bottom portion below said opening forming a base support for the positioning of said press on a surface with the opening and hand grip upwardly spaced from the surface.

16. The garlic press of claim 15 wherein said base support has a lower surface with opposed side edges, and a pair of ribs depending from said lower surface along said side edges.

17. The garlic press of claim 16 wherein said base has laterally spaced side walls rearward of said pivot means, said side walls receiving said press plate bottom panel therebetween, a pressure block on said handle, said side walls also receiving said pressure block therebetween.

18. The garlic press of claim 17 wherein said press plate includes pivot means pivotally mounting said press plate for pivotal movement about said pivot axis independently of said handle, said press plate further comprising a cutter assembly, said base having an upper surface configured to cooperate with said cutter assembly for the severing of an item positioned therebetween.

19. The garlic press of claim 18 wherein said cutter assembly comprises a pair of laterally spaced blades, said upper surface of said base including a pair of ribs positioned to receive said blades immediately adjacent and parallel thereto to define a shearing action therebetween.

20. The garlic press of claim 15 wherein said press plate includes pivot means pivotally mounting said press plate for pivotal movement about said pivot axis independently of said handle, said press plate further comprising a cutter assembly, said base having an upper surface configured to cooperate with said cutter assembly for the severing of an item positioned therebetween.

* * * * *